(12) United States Patent
Dong et al.

(10) Patent No.: US 9,723,441 B2
(45) Date of Patent: Aug. 1, 2017

(54) LOCATION BASED ON CALL DETAIL RECORD

(71) Applicant: International Business Machines Corporation, Armonk, NY (US)

(72) Inventors: Wei Shan Dong, Beijing (CN); Ning Duan, Beijing (CN); Min Gong, Shanghai (CN); Yun Jie Qiu, Shanghai (CN); Yu Wang, Shanghai (CN); Chao Xue, Beijing (CN); Junchi Yan, Shanghai (CN); Chao Zhang, Beijing (CN); Wei Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 14/875,723

(22) Filed: Oct. 6, 2015

(65) Prior Publication Data

US 2017/0099578 A1    Apr. 6, 2017

(51) Int. Cl.
   *H04W 24/00*    (2009.01)
   *H04W 4/02*     (2009.01)
   *H04M 15/00*    (2006.01)
   *H04W 36/00*    (2009.01)

(52) U.S. Cl.
   CPC .......... *H04W 4/022* (2013.01); *H04M 15/41* (2013.01); *H04W 36/0005* (2013.01)

(58) Field of Classification Search
   CPC ... H04W 4/022; H04W 4/24; H04M 2215/32; H04M 15/00; H04M 2215/2026; H04M 17/00

USPC .......... 455/410–411, 412.1–414.2, 418–423, 455/433, 435.2, 436, 444, 552.1, 458, 455/448, 456.1–457, 453, 406; 370/328, 370/338, 310.1, 254, 259
   See application file for complete search history.

(56) References Cited

U.S. PATENT DOCUMENTS

| | | | |
|---|---|---|---|
| 6,278,874 B1 * | 8/2001 | Verdonk | H04W 4/24 455/408 |
| 6,947,835 B2 * | 9/2005 | Kaplan | G08G 1/0104 370/328 |
| 7,546,128 B2 | 6/2009 | Smith et al. | |
| 8,126,124 B2 * | 2/2012 | Cai | G06Q 30/0284 370/230 |
| 8,494,554 B2 | 7/2013 | Marti et al. | |
| 8,504,035 B2 * | 8/2013 | Shin | G06Q 10/06 455/435.1 |

(Continued)

OTHER PUBLICATIONS

Fulop et al, Accurate Mobility Modeling and Location Prediction Based on Pattern Analysis of Handover Series in Mobile Networks, Mobile Information Systems, 2009, pp. 255-289, vol. 5.

(Continued)

*Primary Examiner* — Babar Sarwar
(74) *Attorney, Agent, or Firm* — Alexa Ashworth (57) ABSTRACT

Location based on call detail record. The method includes: acquiring handover call detail record (HCDR) data and handover (HO) data corresponding to at least one cell transfer during a call; The HCDR data can include a start time, an end time, passed cells during the call; The HO data can include the HO time for each pair of adjacent cells among the passed cells during the call. The method can further include estimating the location of the subscriber based on the HCDR data and the HO data.

20 Claims, 6 Drawing Sheets

(56) References Cited

U.S. PATENT DOCUMENTS

| | | | |
|---|---|---|---|
| 8,788,185 B2* | 7/2014 | Yen | G08G 1/012 455/414.1 |
| 8,971,898 B2* | 3/2015 | Maveddat | H04W 8/02 370/332 |
| 9,374,800 B2* | 6/2016 | Cao | H04W 64/00 |
| 2002/0127993 A1* | 9/2002 | Zappala | H04W 24/08 455/404.2 |
| 2005/0226400 A1* | 10/2005 | Farber | H04M 15/8044 379/114.01 |
| 2005/0259798 A1* | 11/2005 | Yarlagadda | H04L 12/581 379/93.23 |
| 2009/0318132 A1* | 12/2009 | Chiou | H04W 24/08 455/423 |
| 2010/0226339 A1* | 9/2010 | Stephenson | H04W 24/08 370/332 |
| 2011/0212721 A1* | 9/2011 | Chang | H04M 15/00 455/433 |
| 2012/0047184 A1* | 2/2012 | Purdy | G06Q 30/0204 707/803 |
| 2013/0211706 A1 | 8/2013 | Brown et al. | |
| 2014/0011513 A1* | 1/2014 | Watts | G01S 5/0252 455/452.2 |
| 2014/0329495 A1* | 11/2014 | Park | H04M 15/66 455/406 |
| 2015/0146689 A1* | 5/2015 | Fu | H04J 3/0632 370/331 |
| 2015/0304863 A1* | 10/2015 | Gupta | H04W 4/04 455/423 |
| 2016/0080579 A1* | 3/2016 | Tuli | H04M 15/8038 455/406 |
| 2016/0344606 A1* | 11/2016 | Baccarani | H04L 41/5067 |
| 2016/0373944 A1* | 12/2016 | Jain | H04W 24/02 |
| 2017/0041762 A1* | 2/2017 | Colonna | H04W 4/028 |

OTHER PUBLICATIONS

Caceres et al, Traffic Flow Estimation Models Using Cellular Phone Data, IEEE Transactions on Intelligent Transportation Systems, Mar. 2012, pp. 1430-1441, vol. 13 Issue 3.

* cited by examiner

LOCATION BASED ON CALL DETAIL RECORD

BACKGROUND

The present invention relates to a location technology, and more specifically, to location method and system based on call detail record (CDR). There is an increased interest on technology based on digital footprints. A digital footprint is the data that is left behind by a user on a digital service. The digital footprint can contain time and location information. Thus, it becomes an important data source in many applications.

Some technologies have been developed to obtain the digital footprints. However, generally, those conventional technologies are expensive and complex. In this regard, there is continued demand for an improved location technology.

SUMMARY

According to one aspect of the present invention, there is a provided method. The method can include acquiring handover call detail record (HCDR) data and handover (HO) data corresponding to at least one cell transfer during a call. The HCDR data can include a start time, an end time, and passed cells during the call. The HO data can include a HO time for each pair of adjacent cells among the passed cells during the call. The method can further include estimating the location of the subscriber based on the HCDR data and the HO data.

According to another aspect of the present invention, there is provided a system. The system can include at least one processor. The system can also include a memory coupled to at least one of the processors. The system can further include a set of computer program instructions stored in the memory and executed by at least one of the processors in order to perform the action of acquiring the HCDR data and the HO data corresponding to at least one cell transfer during a call. The HCDR data can include a start time, an end time, passed cells during the call. The HO data can include HO time for each pair of adjacent cells among the passed cells during the call. The instructions can be executed by at least one of the processors in order to further perform action of estimating the location of the subscriber based on the HCDR data and the HO data.

According to still another aspect of the present invention, there is provided a computer readable non-transitory article of manufacture tangibly embodying computer readable instructions which, when executed, cause a computer to carry out the steps of a method to acquire a HCDR data and a HO data corresponding to at least one cell transfer during a call. The HCDR data can include a start time, an end time, and passed cells during the call. The HO data can include HO time for each pair of adjacent cells among the passed cells during the call. Further, the computer readable non-transitory article of manufacture tangibly embodying computer readable instructions which, when executed cause a computer to carry out the steps of a method to estimate the location of the subscriber based on the HCDR data and the HO data.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

There are several conventional solutions regarding location estimation and velocity estimation. One among those is trilateration. According to trilateration, the location estimation is based on timing advance (TA) and received signal strength (RSS) from all surrounding cell towers. Using propagation models and irradiation diagrams, the mobile phone position can be estimated by finding the point that minimizes the mean square error between measured and estimated mean power received by all base stations. However, trilateration needs special hardware to access data, and needs ad-hoc operation in practice. As a result, it is expensive and has poor availability.

Another solution is map-matching, which assumes movements align with streets/roads. Map-matching is not applicable to areas with no road, and does not work well if there are too many feasible routes.

Another solution is call detail record. Call detail record (CDR, also known as Call Data Record) is a record of mobile phone network data, typically a call setup and completion, and its format varies among telecom providers. CDR can come from different systems, e.g., switch hardware or billing system.

CDR contains time and location (cell) information, and can be used as digital footprint of a subscriber. However, from a conventional concept, limitations in spatial accuracy and data uncertainty have prevented CDR from the use of location estimation. In most cases, spatial accuracy of CDR is around 500 m in urban areas (i.e., at cell area level). A cell can cover even larger areas in reality (especially in suburban areas), and can contain several tens of POIs (Points-Of-Interest) especially in city central business districts. It becomes difficult to know the real location and infer the true behavior.

According to at least one embodiment of the invention, there is provided a system or method for location/velocity estimation based on CDR data, which address at least one defects of the conventional technologies.

Some aspects will be described in more detail with reference to the accompanying drawings, in which the embodiments of the present invention have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
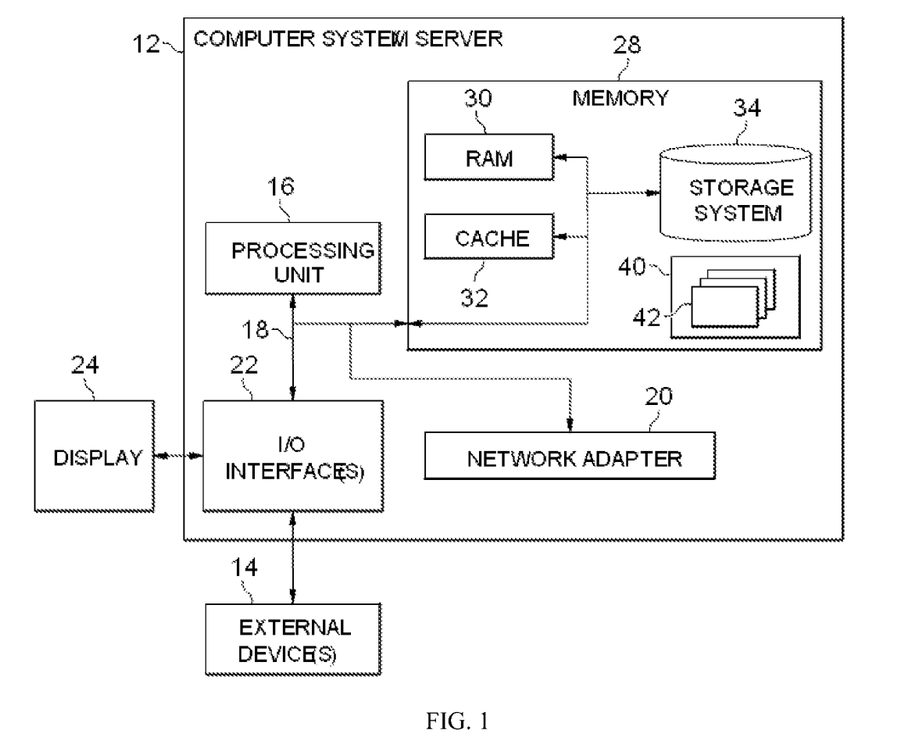
FIG. 1 shows an exemplary computer system which is applicable to implement the embodiments of the present invention.

Referring to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, at least one processor or processing units 16, system memory 28, and bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, but not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, but not limitation, as well as an operating system, at least one application programs, other program modules, and program data. Each of the operating system, at least one application programs, other program modules, and program data or some combination thereof, can include an implementation of a networking environment. Program modules 42 generally carry out the functions and/or methodologies of embodiments of the invention as described herein.

Computer system/server 12 can also communicate with at least one external devices 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
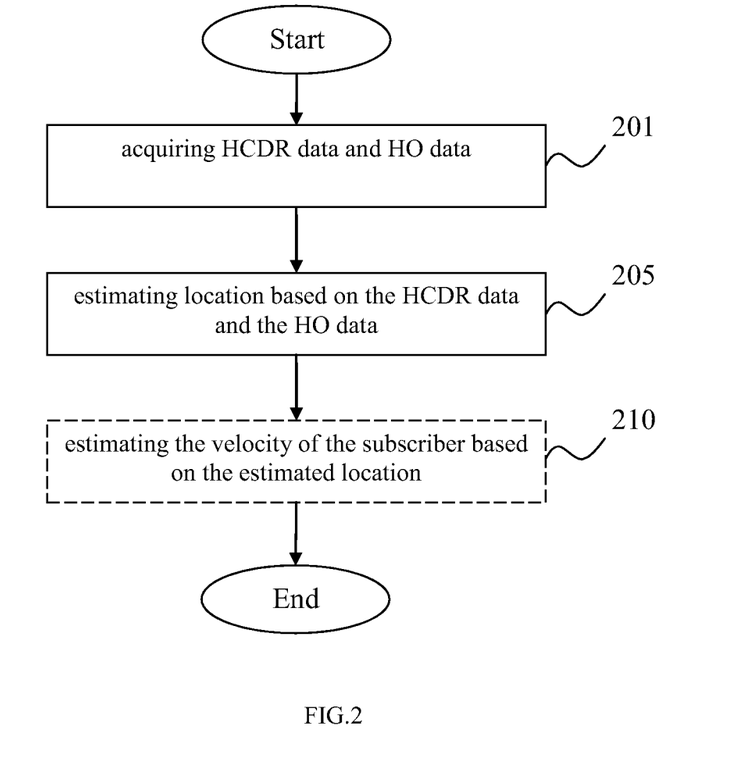
FIG. 2 is a flow diagram depicting steps performed by a method for location/velocity estimation, in accordance with at least one embodiment of the present invention.

Referring to FIG. 2, which is a flow diagram depicting steps performed by a method for location/velocity estimation, in accordance with at least one aspect of the present invention. According to at least one aspect of the present invention, the method starts at step 201, in which the HCDR data and HO data corresponding to at least one cell transfer is acquired. According to aspects of the present invention, the HCDR data can be acquired by filtering the CDR data of the subscriber.

According to one aspect of the present invention, the HCDR herein is defined as CDR with at least one cell transfer. That is, the HCDR can correspond to CDR stream involving at least one handover during a continuous call.

Figure 3:
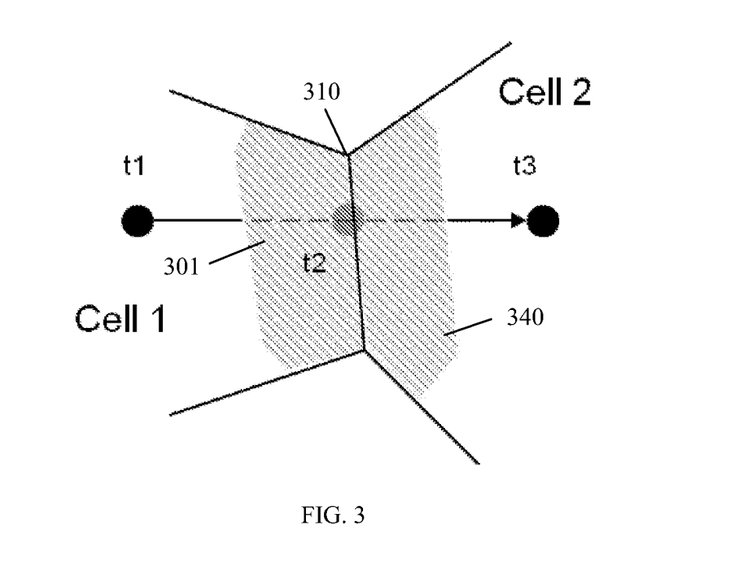
FIG. 3 is diagram depicting cell transfer associated with CDR and HO data, in accordance with at least one embodiment of the present invention.

FIG. 3 is diagram depicting cell transfer associated with CDR and HO data, in accordance with at least one aspect of the present invention. As illustrated in FIG. 3, for example, a subscriber can start a call at t1 and end it at t3, during which the subscriber moves from cell 1 to cell 2. That is, cell1 and cell 2 are passed during the call. The handover occurs at boundary 310 between cell 1 and cell 2. According to aspects of the present invention, by way of example, but not limitation, the HCDR can be represented as a start time, an end time, passed cells during the call (a start cell and an end cell in this example), as shown in table 1.

TABLE 1

| an example of HCDR data | | | |
| --- | --- | --- | --- |
| Start Time | End Time | Start Cell | End Cell |
| t1 | t3 | Cell1 | Cell2 |

According to one aspect of the present invention, handover (HO) data indicates the time when the subscriber move across the cell border. That is, HO data records the cell tower transfer within a call. By way of example, but not limitation, the HO data can be represented as HO time, from cell, and to cell, as shown in table 2.

TABLE 2 an example of HO data

| HO Time | From Cell | To Cell |
|---|---|---|
| t2 | Cell1 | Cell2 |

According to one aspect of the present invention, the HCDR data can include the CDR data corresponding to calls occurred with a short time gap. In other word, calls occurred with a short time gap can also be treated as CDR with at least one cell transfer (CDR/HO) case. This time gap can be determined according to desirable location accuracy, and adjusted according to the result of location estimation.

According to at least one aspect of the present invention, the method can proceed to estimate the location of the subscriber based on the HCDR data and the HO data (step 205). According to aspects of the present invention, time difference between handover (HO) time and HCDR start/end time can indicate the moving period inside each cell. Reachable region or location of the subscriber in cell area is limited by the moving period. In particular, the speed of subscriber and the time between call and handover sets a limit for the max possible travel distance between the call and handover.

According to one aspect of the present invention, the reachable region of each cell can be estimated by multiplying the moving period and average velocity of subscriber or mobile phone. For example, the average velocity can be available from history data of the telecom providers, traffic administration department, and the like.

By way of example, but not limitation, by reference to FIG. 3, a first reachable region 301 in cell 1 can be estimated by multiplying the moving period ($\Delta t = t2 - t1$) and average velocity (v), and a second reachable region 340 in cell 2 can be estimated by multiplying the moving period ($\Delta t = t3 - t2$) and the average velocity (v).

Figure 5:
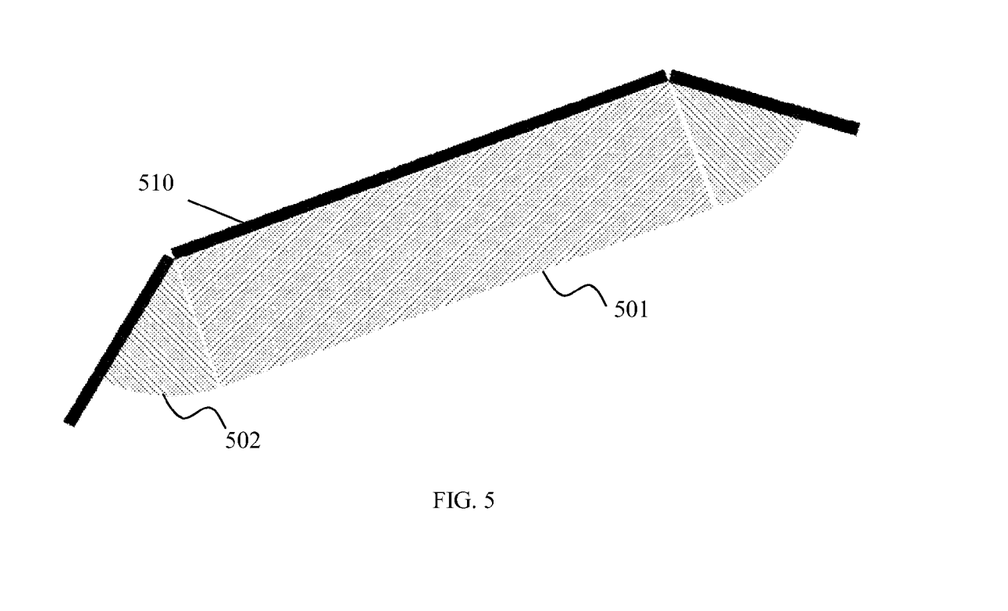
FIG. 5 is diagram depicting concept of estimated location in accordance with at least one embodiment of the present invention.

FIG. 5 is diagram depicting concept of estimated location in accordance with at least one aspect of the present invention. As illustrated, reachable region 501 (i.e., the reachable region 301 or 340) can include a rectangle region having a long side 510 as the cell border where handover happens. The reachable region 501 further includes two fan-like regions 502 adjacent to the rectangle region and bound by other borders adjacent to the side 510. The radius of the fan-like region 502 and the short side of the rectangle region can be determined as $v*\Delta t$, as described above.

According to aspects of the present invention, the reachable region is in fact the point set among the CDR which contains the points whose distance to the border line is no longer than the max travel distance. Thus, the location uncertainty according to at least one aspect of present invention can be lowered to reachable sub-region among the cell area, instead of the whole cell area level.

According to at least one aspect, the reachable region or location can be estimated directly with a simple equation such as $v*\Delta t$, as described above. In this regards, the aspects of the present invention involve closed-form moving scope estimation, which is cost-effective.

Figure 6:
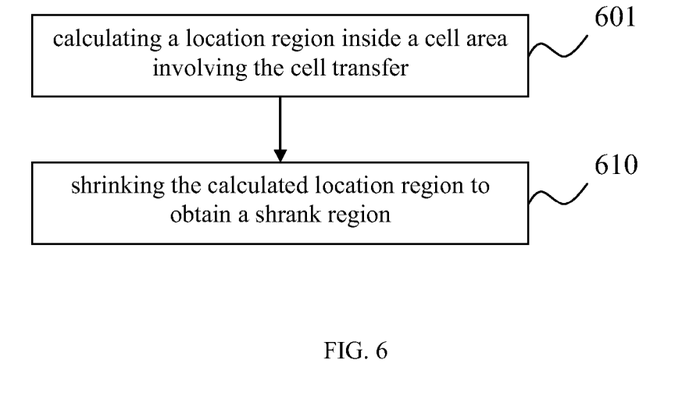
FIG. 6 is a flow diagram depicting processes in estimating step performed by a method for location/velocity estimation, in accordance with at least one embodiment of the present invention.

With reference now to FIG. 6, which is a flow diagram depicting processes in estimating step performed by a method for location/velocity estimation, in accordance with at least one aspect of the present invention.

According to at least one aspect, in the estimating step (e.g., step 205), the method includes calculating a location region of the subscriber inside a cell area involving the cell transfer by using the HCDR data and the HO data, with reference to cell area geometry indicating handover boundary (step 601). According to aspects of the present invention, the cell area geometry can be obtained through any known technology, such as Voronoi tessellation. According to aspects of the present invention, the borders between each pair of cell areas are determined by Voronoi diagram. The other details are similar as those described with respect to step 205, and thus are omitted herein to avoid duplication.

For the purpose of explanations, the above description is made with respect to an illustrative example in which one handover event occurs during the call corresponding to the HCDR data. As will be appreciated by the skilled one, the present invention is applicable to a case that at least one handover event occurs during the call corresponding to the HCDR data.

According to at least one aspect, in the estimating step, when multiple HOs are attached to one HCDR, the method can further include shrinking the calculated location region to remove an unfeasible part of the calculated location region to obtain a shrank region (step 610).

Figure 4A:
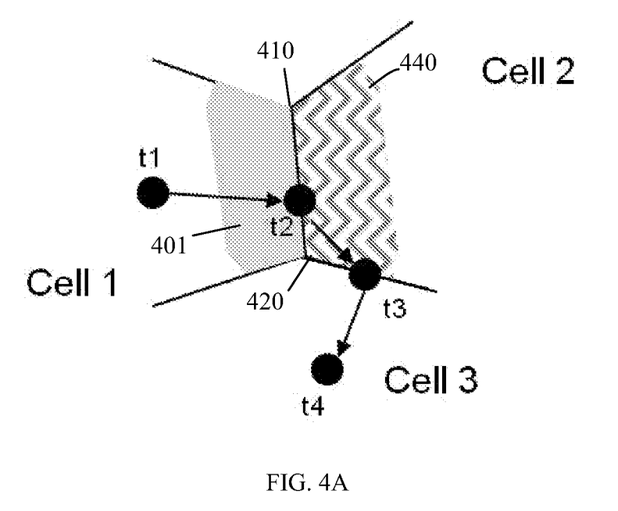
FIGS. 4A-4C are diagrams depicting concept of shrinking location region, in accordance with at least one embodiment of the present invention.
Figure 4B:
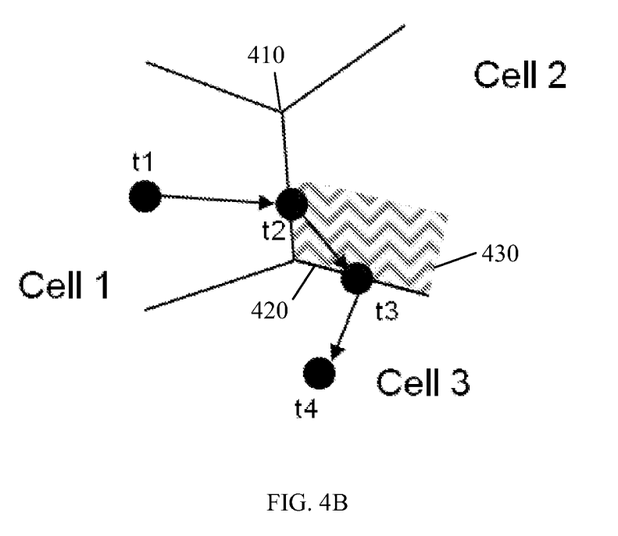
Figure 4C:
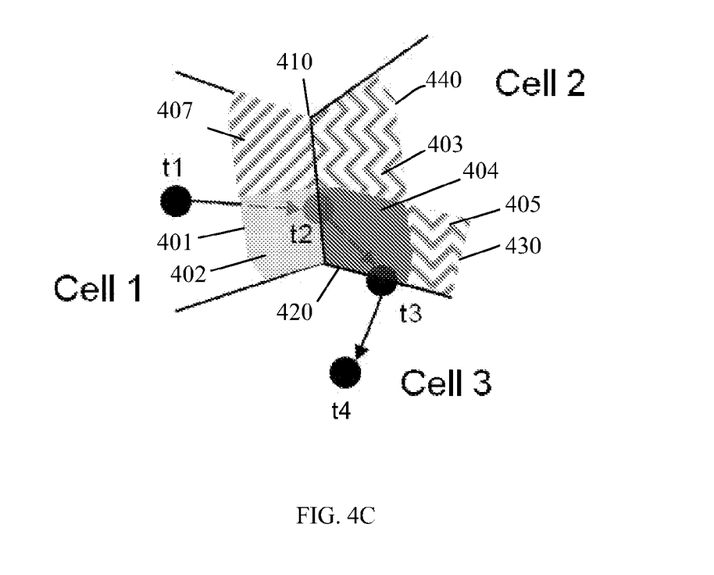

FIGS. 4A-4C are diagrams depicting concept of shrinking location region, in accordance with at least one aspect of the present invention.

As illustrated in FIGS. 4A-4C, for example, a subscriber can start a call at t1 and end it at t4, during which the subscriber moves from cell 1 to cell 2, crosses cell 2 and arrives at cell 3. That is, cell1 to cell3 are passed during the call. In such case, the HCDR can be represented as a start time, an end time, passed cells during the call (a start cell, an intermediate cell, and an end cell in this example), as shown in table 3. There are two handovers at time t2 and t3 respectively. That is, the movement of the subscriber crosses both handover boundary 410 between cell 1 and cell 2 and handover boundary 420 between cell 2 and cell 3. Accordingly, there are multiple (two in this example) HO data, as shown in table 4. According to at least one aspect, time difference between adjacent HOs ($\Delta t = t3 - t2$ in this example) can be used as the moving period to calculate a reachable part in the passed cell (cell 2 in this example), as described below.

TABLE 3 another example of HCDR data

| Start Time | End Time | Start Cell | Intermediate Cell | End Cell |
|---|---|---|---|---|
| t1 | t4 | Cell1 | Cell2 | Cell3 |

TABLE 4 another example of HO data

| HO Time | From Cell | To Cell |
|---|---|---|
| t2 | Cell1 | Cell2 |
| t3 | Cell2 | Cell3 |

According to at least one aspect, in a way similar as that described above with reference to FIGS. 3 and 6, for example, a first reachable region 401 inside cell 1, a second reachable region 440 inside cell 2, can be estimated with the HCDR data and the HO data related to a first handover boundary (handover boundary 410 in this example) respectively (see FIG. 4A). By way of example, but not limitation, the first reachable region 401 in cell 1 can be estimated by multiplying the moving period (Δt=t2−t1) in cell 1 and average velocity (v), and the second reachable region 440 in cell 2 can be estimated by multiplying the moving period (Δt=t3−t2) in cell 2 and the average velocity (v) with reference to handover boundary 410 as the cell border. Also, a third reachable region 430 inside cell 2 can be estimated with the HCDR data and the HO data related to a second handover boundary (handover boundary 420 in this example), as shown in FIG. 4B. By way of example, but not limitation, the third reachable region 430 in cell 2 can be estimated by multiplying the moving period (Δt=t3−t2) in cell 2 and average velocity (v) with reference to handover boundary 420 as the cell border. It is noted that the reachable region inside cell 3 is not shown in the figure for a purpose of clarity.

Figure 7:
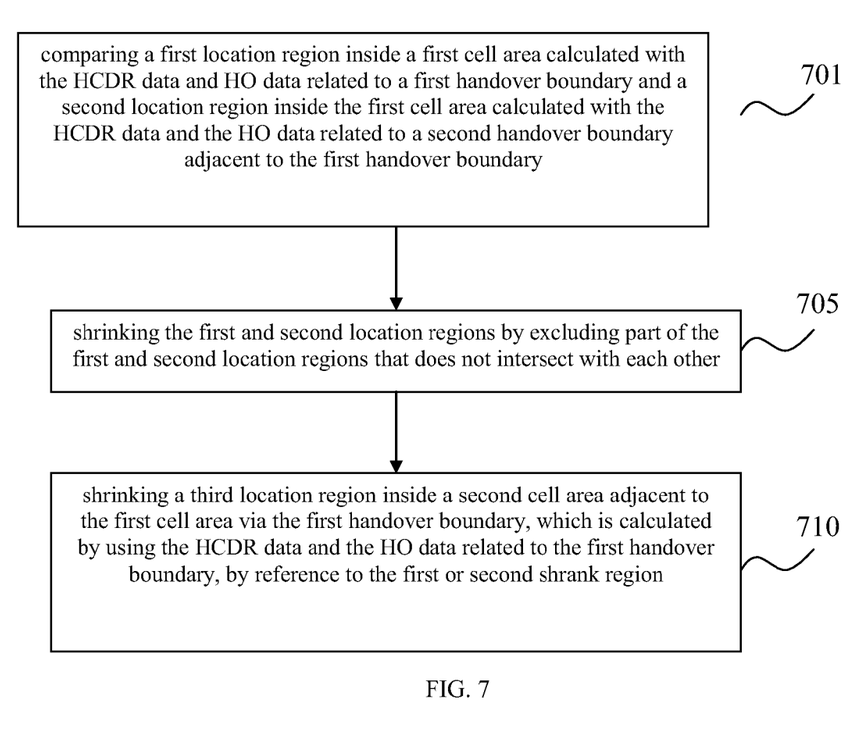
FIG. 7 is a flow diagram depicting further processes in estimating step performed by a method for location/velocity estimation, in accordance with at least one embodiment of the present invention.

With reference now to FIG. 7, which is a flow diagram depicting further processes in shrinking step (e.g., step 610), in accordance with at least one aspect of the present invention.

According to at least one aspect of the present invention, the shrinking includes comparing a first location region (e.g., second reachable region 440) inside a first cell area (e.g., cell 2) calculated with the HCDR data and the HO data related to a first handover boundary and a second location region (e.g., third reachable region 430) inside the first cell area calculated with the HCDR data and the HO data related to a second handover boundary adjacent to the first handover boundary (step 701). The shrinking can further include shrinking the first location region by excluding part of the first and second location regions that does not intersect with each other (step 705). By way of example, but not limitation, by reference to FIG. 4C, part 403 of second reachable region 440 and part 405 of third reachable region 430 does not intersect with each other, and thus can be excluded from the reachable region respectively, so as to obtain the shrank first or second location region 404. Thereby, according to aspects of the present invention, the shrank region can correspond to the feasible region for the location of the subscriber, since the region that does not intersect actually can indicate the unfeasible region.

According to at least one aspect of the present invention, optionally, the shrinking can further include shrinking a third region (e.g., first reachable region 401) inside a second cell area (e.g., cell 1) adjacent to the first cell area via the first handover boundary, by reference to the shrank first or second location region 404 (step 710). For example, this can be performed by excluding part of the third region that is not adjacent to the shrank first or second location region 404. By way of example, but not limitation, by reference to FIG. 4C, part 407 of first reachable region 401 is not adjacent to the shrank first location region 404, and thus can be excluded from the first reachable region 401, so as to obtain shrank third location region 402.

According to at least one aspect of the present invention, the shrinking process as described can be performed iteratively along the handover boundaries through the sequence of multiple HOs attached to one HCDR. Thereby, the location uncertainty can be further reduced.

With reference to FIG. 2 again, according to at least one aspect of the present invention, the method can further include estimating the velocity of the subscriber based on the estimated location (step 210). As described above, the estimated location can be further shrank, and the location uncertainty for feasible region can be reduced. Accordingly, the velocity of the subscriber can be estimated with higher accuracy than the preset average velocity.

Figure 8:
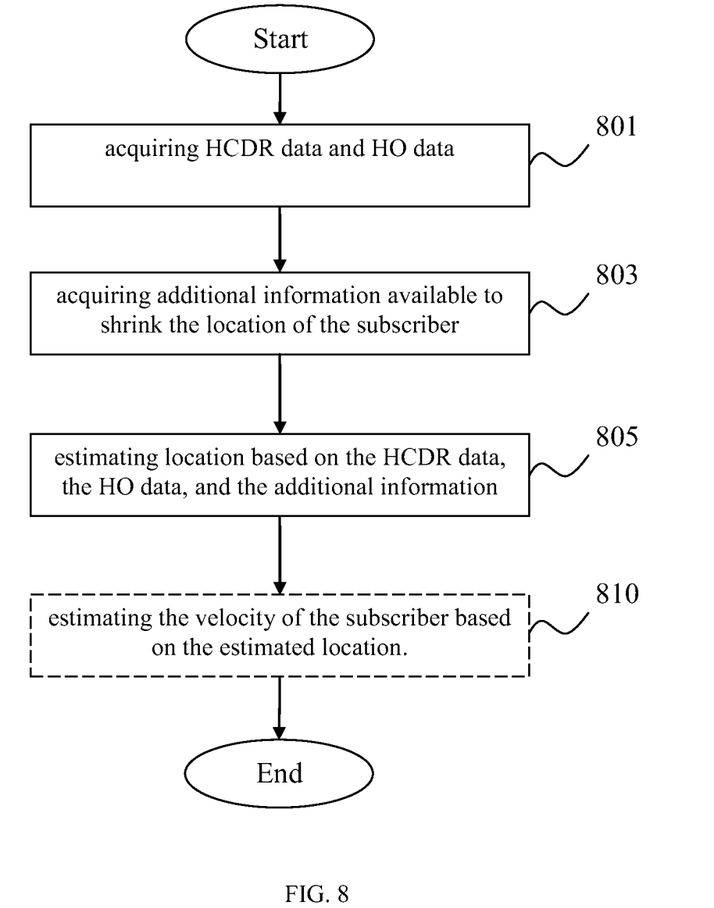
FIG. 8 is a flow diagram depicting steps performed by a method for location/velocity estimation, in accordance with at least one embodiment of the present invention.

With reference now to FIG. 8, which is a flow diagram depicting steps performed by a method for location/velocity estimation, in accordance with at least one aspect of the present invention.

According to at least one aspect of the present invention, the method starts at step 801, in which the HCDR data and the HO data corresponding to at least one cell transfer is acquired. The process is similar as those described above aspects of the present invention, and thus are omitted herein.

According to at least one aspect of the present invention, the method further includes acquiring additional information available to shrink the location of the subscriber (step 803). By way of example, but not limitation, the additional information can includes at least one from the group of GPS information, WIFI information, possible transportation mode, road network data, subscriber's transaction information, location history, and the like.

According to at least one aspect of the present invention, the method can proceed to estimate the location of the subscriber based on the HCDR data, the HO data and the additional information (step 805). For example, if there is a WIFI Access Point (AP) inside the feasible region, then the location of the subscriber can be narrowed based on the AP information. By way of example, but not limitation, if the AP information indicates there is a hospital as the real location near the HO boundary, we can infer the true behavior of the subscriber can be going to a hospital.

According to at least one aspect of the present invention, optionally, the method of present invention can further include estimating the velocity of the subscriber based on the estimated location (step 810). As described above, the estimated location can be further shrank, and the location uncertainty for feasible region can be reduced. By way of example, but not limitation, the first reachable region 401, the second reachable region 440, or the third reachable region 430 calculated with the preset average velocity (v) can be shrank into the shrank third location region 402, first or second location region 404 respectively. The points in the shrank location regions can be limited to the points whose distance to the border line is shorter than those reachable regions calculated with the preset average velocity (v). That is, the max travel distance based on the shrank location regions can be shrank accordingly. In accordance with the shrank max travel distance and moving period (Δt) of a subscriber, the actual velocity of the subscriber can be estimated with higher accuracy than the preset average velocity.

According to at least one aspect, the present invention can provide location in a way cost effective with higher accuracy.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some aspects of the present invention, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various aspects of the present invention. In this regard, each block in the flowchart or block diagrams can represent a module, segment, or portion of code, which includes at least one executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for estimating the location of a subscriber, comprising:
    acquiring a handover call detail record (HCDR) data and a handover (HO) data corresponding to at least one cell transfer during a call, wherein the HCDR data includes a start time, an end time, passed cells during the call, and the HO data includes HO time for each pair of adjacent cells among the passed cells during the call; and
    estimating the location of the subscriber based on the HCDR data and the HO data.

2. The method of claim 1, wherein the estimating comprises:
    calculating a location region of the subscriber inside a cell area involving the cell transfer by using the HCDR data and the HO data, with reference to cell area geometry indicating handover boundary.

3. The method of claim 2, wherein the estimating further comprises:
    shrinking the calculated location region to remove an unfeasible part of the calculated location region to obtain a shrank region.

4. The method of claim 3, wherein the shrinking comprises:
    comparing a first location region inside a first cell area calculated with the HCDR data and the HO data related to a first handover boundary and a second location region inside the first cell area calculated with the HCDR data and the HO data related to a second handover boundary adjacent to the first handover boundary; and
    shrinking the first and second location regions by excluding part of the first and second location regions that do not intersect with each other to obtain first and second shrank regions.

5. The method of claim 4, wherein the shrinking further comprises:
    shrinking a third region inside a second cell area adjacent to the first cell area via the first handover boundary, which is calculated by using the HCDR data and the HO data related to the first handover boundary, by reference to the first or second shrank region, to obtain a third shrank region.

6. The method of claim 1, further comprising:
    acquiring additional information available to shrink the location of the subscriber, wherein the additional information includes at least one from the group of GPS information, WIFI information, possible transportation mode, road network data, subscriber's transaction information, location history, wherein the estimating is further based on the additional information.

7. The method of claim 1, further comprising:
    estimating the velocity of the subscriber based on the estimated location.

8. A system for estimating the location of a subscriber comprising:
    at least one processor;
    a memory coupled to at least one of the processors; and
    a set of computer program instructions stored in the memory and executed by at least one of the processors to perform the steps of:
    acquiring a handover call detail record (HCDR) data and a handover (HO) data corresponding to at least one cell transfer during a call, wherein the HCDR data includes a start time, an end time, passed cells during the call, and the HO data includes HO time for each pair of adjacent cells among the passed cells during the call; and
    estimating the location of the subscriber based on the HCDR data and the HO data.

9. The system of claim 8, wherein the estimating comprises:
    calculating a location region of the subscriber inside a cell area involving the cell transfer by using the HCDR data and the HO data, with reference to cell area geometry indicating handover boundary.

10. The system of claim 9, wherein the estimating further comprises:
    shrinking the calculated location region to remove an unfeasible part of the calculated location region to obtain a shrank region.

11. The system of claim 10, the shrinking comprises:
    comparing a first location region inside a first cell area calculated with the HCDR data and the HO data related to a first handover boundary and a second location region inside the first cell area calculated with the HCDR data and the HO data related to a second handover boundary adjacent to the first handover boundary; and
    shrinking the first location and second regions by excluding part of the first and second location regions that does not intersect with each other to obtain first and second shrank regions.

12. The system of claim 11, wherein the shrinking further comprises:
    shrinking a third region inside a second cell area adjacent to the first cell area via the first handover boundary, which is calculated by using the HCDR data and the HO data related to the first handover boundary, by reference to the first or second shrank region, to obtain a third shrank region.

13. The system of claim 8, wherein the computer program instructions are executed by at least one of the processors in order to further perform actions of:
    acquiring additional information available to shrink the location of the subscriber, wherein the additional information includes at least one from the group of GPS information, WIFI information, possible transportation mode, road network data, subscriber's transaction information, location history; and
    wherein the estimating is further based on the additional information.

14. The system of claim 8, wherein the computer program instructions are executed by at least one of the processors in order to further perform actions of estimating the velocity of the subscriber based on the estimated location.

15. A computer readable non-transitory article of manufacture tangibly embodying computer readable instructions which, when executed, cause a computer to carry out the steps of a method comprising:
    acquiring a handover call detail record (HCDR) data and a handover (HO) data corresponding to at least one cell transfer during a call, wherein the HCDR data includes a start time, an end time, passed cells during the call, and the HO data includes HO time for each pair of adjacent cells among the passed cells during the call; and
    estimating the location of the subscriber based on the HCDR data and the HO data.

16. The computer readable non-transitory article of manufacture tangibly embodying computer readable instructions of claim 15, wherein the estimating comprises:
    calculating a location region of the subscriber inside a cell area involving the cell transfer by using the HCDR data and the HO data, with reference to cell area geometry indicating handover boundary.

17. The computer readable non-transitory article of manufacture tangibly embodying computer readable instructions of claim 16, wherein the estimating further comprises:
    shrinking the calculated location region to remove an unfeasible part of the calculated location region to obtain a shrank region.

18. The computer readable non-transitory article of manufacture tangibly embodying computer readable instructions of claim 17, wherein the shrinking comprises:

comparing a first location region inside a first cell area calculated with the HCDR data and the HO data related to a first handover boundary and a second location region inside the first cell area calculated with the HCDR data and the HO data related to a second handover boundary adjacent to the first handover boundary; and shrinking the first and second location regions by excluding part of the first and second location regions that do not intersect with each other to obtain first and second shrank regions.

19. The computer readable non-transitory article of manufacture tangibly embodying computer readable instructions of claim 18, wherein the shrinking further comprises:

shrinking a third region inside a second cell area adjacent to the first cell area via the first handover boundary, which is calculated by using the HCDR data and the HO data related to the first handover boundary, by reference to the first or second shrank region, to obtain a third shrank region.

20. The computer readable non-transitory article of manufacture tangibly embodying computer readable instructions of claim 15, further comprising:

acquiring additional information available to shrink the location of the subscriber, wherein the additional information includes at least one from the group of GPS information, WIFI information, possible transportation mode, road network data, subscriber's transaction information, location history, wherein the estimating is further based on the additional information.

* * * * *